Feb. 18, 1958    K. H. STEIGERWALD    2,824,232
METHOD AND DEVICE FOR THE TRANSMISSION OF HIGH SPEED
RADIATION, PARTICULARLY CORPUSCULAR RADIATION,
BETWEEN SPACES OF DIFFERENT PRESSURE

Filed Oct. 24, 1956    5 Sheets-Sheet 1

Inventor
Karl Heinz Steigerwald
By Singer Stern & Carlberg
attorneys

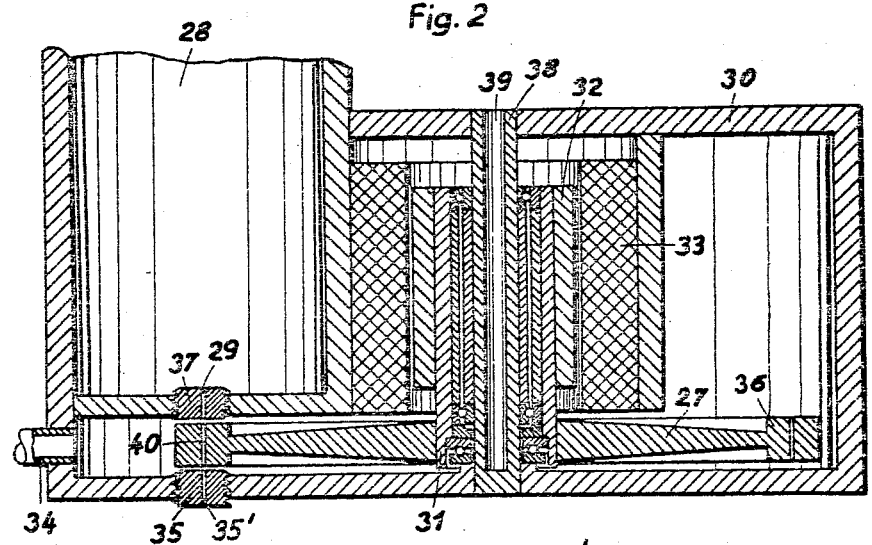
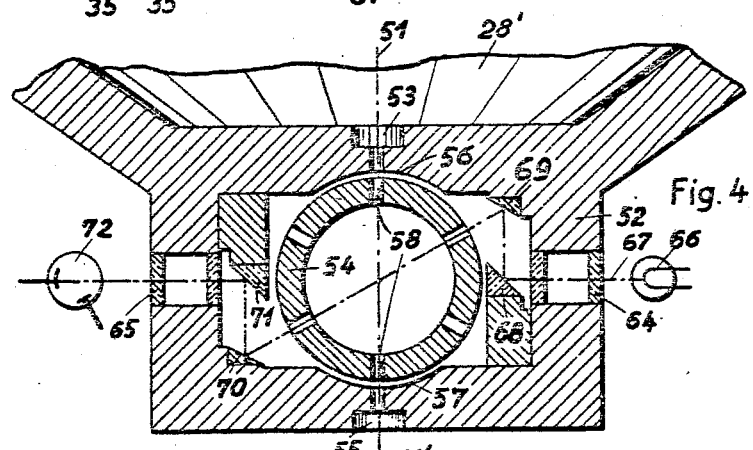
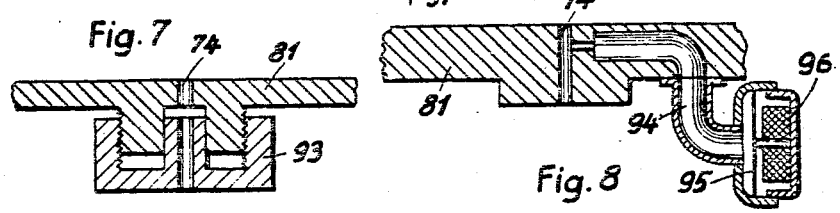

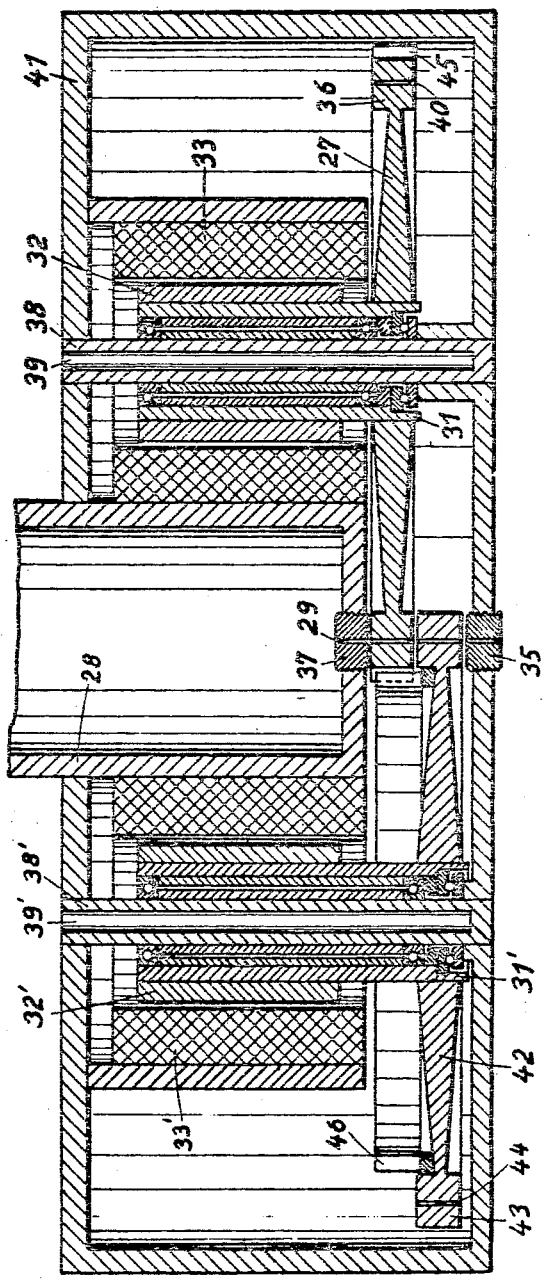

Feb. 18, 1958     K. H. STEIGERWALD     2,824,232
METHOD AND DEVICE FOR THE TRANSMISSION OF HIGH SPEED
RADIATION, PARTICULARLY CORPUSCULAR RADIATION,
BETWEEN SPACES OF DIFFERENT PRESSURE
Filed Oct. 24, 1956     5 Sheets-Sheet 4
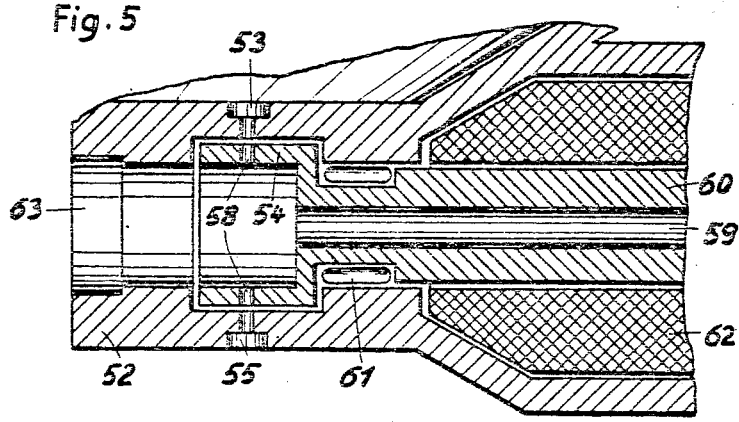
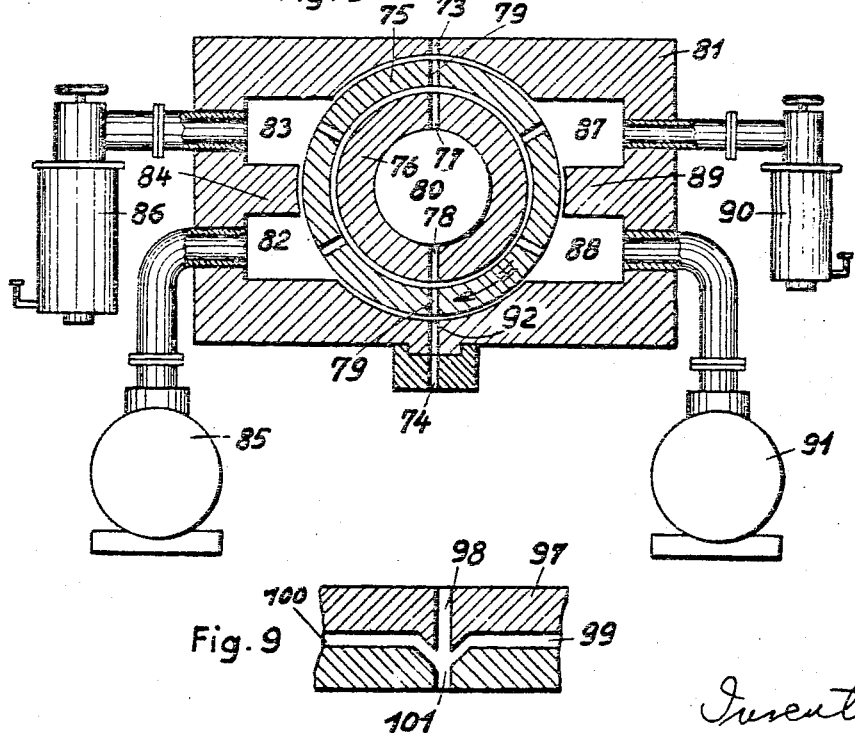

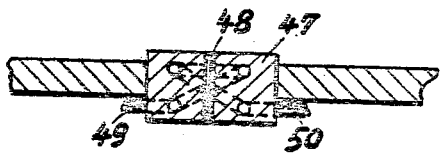
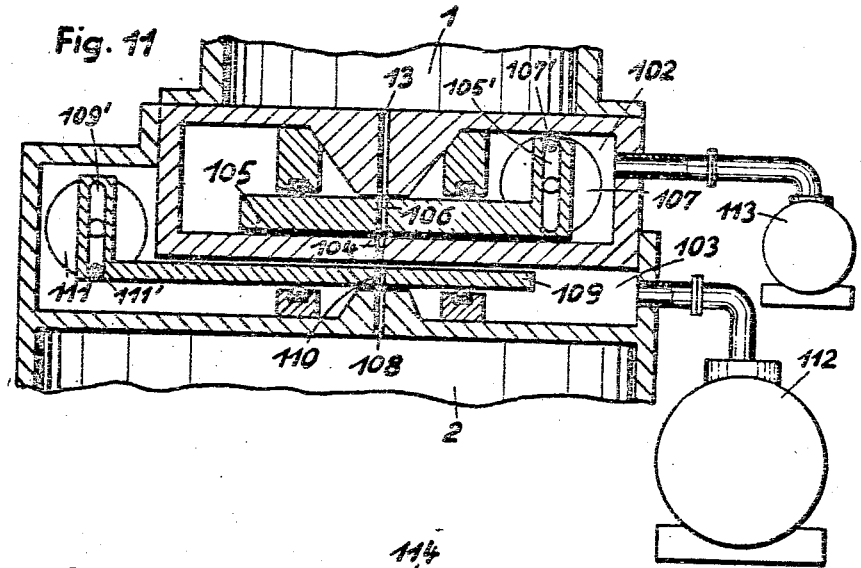
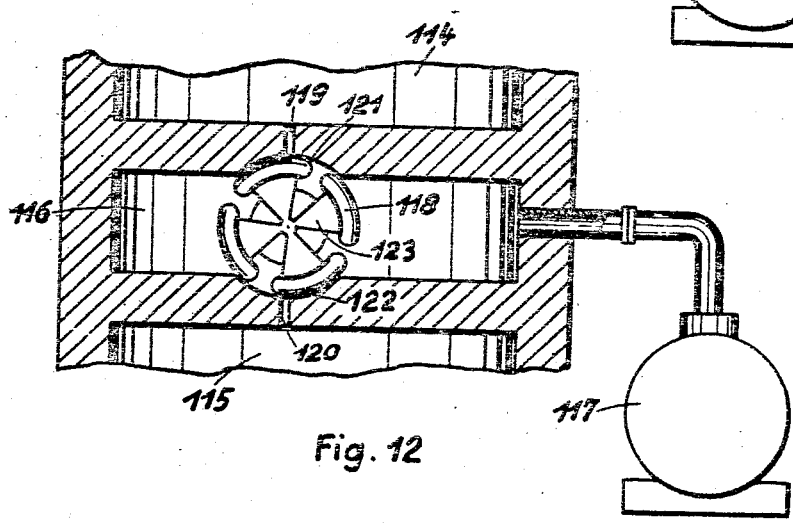

United States Patent Office 2,824,232
Patented Feb. 18, 1958

2,824,232

METHOD AND DEVICE FOR THE TRANSMISSION OF HIGH SPEED RADIATION, PARTICULARLY CORPUSCULAR RADIATION, BETWEEN SPACES OF DIFFERENT PRESSURE

Karl Heinz Steigerwald, Heidenheim, Wurttemberg, Germany, assignor to Carl Zeiss, Heidenheim (Brenz), Wurttemberg, Germany Application October 24, 1956, Serial No. 618,037

Claims priority, application Germany October 29, 1955

8 Claims. (Cl. 250—49.5)

The invention relates to a method and device for the transmission of high speed radiation, particularly corpuscular radiation, between spaces of different pressures.

In order to enable the transition of high speed radiation, particularly corpuscular radiation, between spaces subjected to different pressures without alteration of the pressure in these spaces one makes use of transparent windows, e. g., of Lenard windows. In such an arrangement the absorption caused by the windows is the main cause of disturbance and leads in certain circumstances to a destruction of the windows. It has also been proposed to arrange intermediate pressure chambers between spaces of different pressure. Such chambers are described e. g. in the German patent specification 916,841. In such an arrangement each intermediate pressure chamber stands under another pressure and is provided with apertures. All said chambers are connected to vacuum pumps. The capacity of these pumps limits the size of the apertures employed to let the radiation pass through. This may cause difficulties in designing the path of the rays and also is apt to cause a loss of intensity.

According to the invention the transition of high speed radiation, particularly corpuscular radiation, between spaces standing under different pressure provided with apertures for the radiation to pass through is made possible without alteration of the pressure in these spaces by having the apertures of two spaces of different pressure alternately connected to each other and separated from each other by a device arranged between said apertures of the two spaces and provided with apertures for letting the radiation pass through.

During the separation of the apertures of the two spaces the gas having penetrated into the apertures of said device is removed and the radiation is interrupted. In this method use is made of the difference between the speed of the radiation and the speed of the gas molecules. The time during which the two spaces standing under different pressure are connected by an aperture of said device being arranged between the apertures of the two spaces is kept shorter than the time which the gas molecules penetrating into connecting aperture of said device require to pass through it. In this case no molecules can penetrate from the space of higher pressure into the space of lower pressure. If the space of lower pressure is connected to a high vacuum pump it is also possible to limit the time during which two spaces are connected so that only such a small portion of the gas molecules can pass through the connecting apertures, which can be drawn off by the vacuum pump.

For the realization of the method according to the invention there is a separating chamber arranged between two spaces standing under different pressure. This separating chamber contains a device fitted with bores which is moved between the apertures of the two spaces. In said separating chamber there is further arranged a control device which upon separation of the apertures of the two spaces interrupts the radiation. In order to render possible the removal of the gas penetrated into the bores of said device during connecting the two spaces the separating chamber is connected to a vacuum pump.

According to one embodiment of the invention there is arranged within the separating chamber a disc fitted with a circular series of holes. This disc is moved between the apertures of the two spaces standing under different pressure so that the holes in that disc alternately connect and separate the apertures of the two spaces. Said disc is ground plane and parallel. The apertures of the two spaces carry adjustable and interchangeable diaphragms. Thereby it is made possible to keep the distances between the disc and the walls of the two spaces very small. With advantage the spindle of the perforated disc is coupled with the rotor of an electromotor e. g. of a synchronous motor. In order to avoid too high speeds of revolution of the disc arranged in the separating chamber it is further advantageous to use two synchronously counter-rotating discs.

A particularly advantageous arrangement is obtained if according to a further embodiment of the invention a drum fitted with radial bores is arranged within the separating chamber. This drum may be arranged on a common spindle with the rotor of a synchronous motor lying at right angles to the direction of propagation of the radiation. In order to keep the distance between the periphery of the drum and the walls of the two spaces as small as possible the sides of these walls which lie towards the drum are ground cylindrically. In this embodiment a particularly simple controlling device for the radiation may be arranged. The separating chamber may e. g. carry windows through which light enters into the separating chamber. This light passes through bores in the drum and is thereafter incident upon a photoelectric cell. The electrical voltage produced in this cell serves to control the radiation to be passed through the bores in that drum. The arrangement is therein made in such a way that light can only penetrate through the bores of the drum when the two spaces to be connected are in communication through the bores in the drum.

According to a still further embodiment of the invention there is arranged inside the rotating drum a fixed drum also fitted with apertures whose apertures stand opposite those of the spaces to be connected. The connection of the two spaces in this case takes place on the one hand via the rotating drum and on the other via the fixed drum. In this case it is possible to keep practically all the amount of gas entering the bores of the rotating drum from entering into the space inside the fixed drum. It is therein advantageous to subdivide the separating chamber containing two drums into four spaces. The two spaces in the separating chamber which are next to the space standing under higher pressure are connected to a pump which produces high suction at comparatively high pressures. Such a pump has been selected for the reason that in these two spaces the gas molecules collect which enter through the aperture of the space of higher pressure and are pulled along by the rotating drum. Correspondingly a somewhat higher pressure than in the two upper spaces results in these two lower spaces of the separating chamber. These two upper spaces are therefore connected to a pump producing high suction at low pressures. Instead of the devices so far described other devices may be also arranged in the separating chamber which serve for the alternating opening and closing of the communication between the spaces standing under different pressure. For instance there may be arranged in the separating chamber an oscillating system which also contains bores. Similar effects may also be obtained with systems of which parts roll upon the sealing surfaces or/and upon each other and which thereby alternately connect and separate the two spaces standing under different pressure. In all these arrangements it is comparatively simple to fit a control device for the radiation. This may in principle be electro-magnetic, photo-electrical, or of any kind or manner suited to the particular case in which magnetic or capacitive sensing devices are used.

In order to obtain a sufficient intensity of the rays while the two spaces are connected to each other e. g. the accelerating voltage of the radiation producing system may be periodically varied. Velocity modulation is effected thereby so that upon connecting the two spaces to each other radiation of high intensity can be passed through the communication opening.

In order to assist the efficiency of the devices so far described according to a further characteristic of the invention there is excited in the aperture of the space of higher pressure a sound oscillation which upon opening of the communication between the two spaces produces a negative pressure at the edge of the separating chamber. This sound oscillation may be produced by an electromagnetic system. It may, however, also be produced by tuning the air column contained in the aperture of the space of higher pressure to the frequency of opening.

According to a further characteristic of the invention the aperture of the space of higher pressure contains lateral channels through which gas or vapor passes in the direction towards the space of higher pressure at high velocity. Such an aperture with lateral channels may also be arranged below the aperture of the space of higher pressure. With the devices described it is also possible to transmit a plurality of corpuscular rays through two spaces standing under different pressure through different apertures.

The invention consists in the novel steps and novel parts and in the combination and arrangements thereof which are defined in the appended claims and of which a few embodiments are exemplified in the accompanying drawings which are hereinafter particularly described and explained.

In the drawings

Figure 2 is a sectional view of a similar device for transmitting high speed radiation between spaces subjected to different pressures in which a rotary disc is employed.

Figure 3 is a sectional view of another device according to the invention in which two synchronous oppositely rotating discs are employed.

Figure 4 is a sectional view of still another device according to the invention in which a rotary drum is employed.

Figure 5 is a sectional view of a device illustrated in Figure 4 along the line 51—51'.

Figure 6 is a sectional view of another device according to the invention in which a rotary drum and a stationary drum are employed.

Figure 7 is a sectional view of a device for acoustical tuning of the air column of the spaces subjected to the higher pressure of the aperture frequency.

Figure 8 is a sectional view of a device for producing a sound wave in the aperture of the space subjected to the higher pressure by means of electromagnetic means.

Figure 9 is a sectional view of a device for reducing the air pressure in the aperture of the space subjected to the higher pressure.

Figure 10 is a sectional view of a device for cooling the apertures through which the charge carrying ray passes.

Figure 11 is a sectional view of an arrangement employing a plurality of movable devices containing separating chambers between the spaces of different pressure.

Figure 12 is a sectional view of a device according to the invention which employs molded bodies which slide relative to the apertures in the spaces of different pressures.

Figure 1:
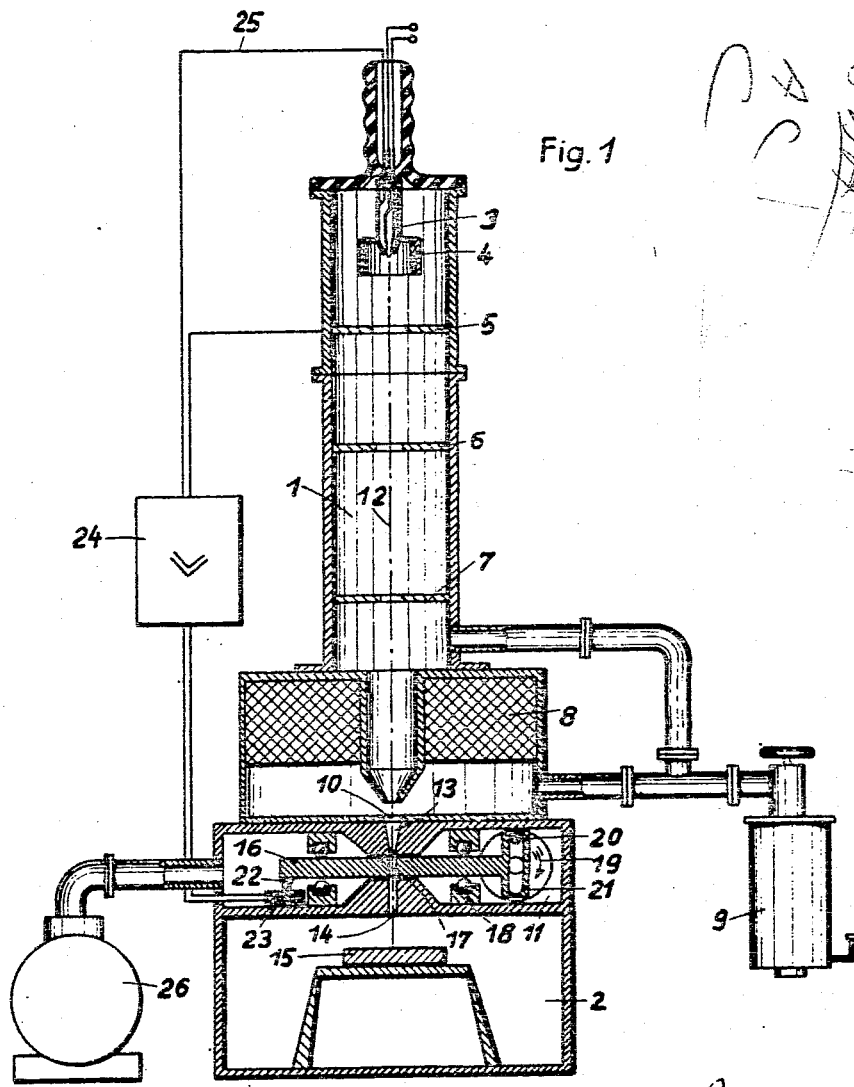
Figure 1 is a sectional view of a device for treating material with a charge carrying ray, in which device the method for transmitting high speed radiation, particularly corpuscular radiation between spaces subjected to different pressures is employed.

Figure 1 illustrates an arrangement for treating material by means of charge carrying rays. The space 1 contains a ray producing system and has produced therein a high vacuum. The space 2 contains the material 15 to be treated and is under atmospheric pressure. The ray producing system in the space 1 consists of a cathode 3, a Wehnelt cylinder 4, an anode 5 and two diaphragms 6 and 7. Below the diaphragm 7 there is arranged an electromagnetic lens 8 which is employed for focusing the electron beam. The space 1 is connected by pipelines with a diffusion pump 9. The electron beam 12 leaves the space 1 through the aperture 10. Below this aperture 10 is arranged a separation chamber 11 which is connected with the rotary pump 26. In this chamber 11 there is maintained for instance a pressure of $10^{-2}$ Torr. The aperture 10 of the space 1 is followed by the aperture 13 in the separation chamber 11. The aperture serving for the discharge of the charge carrying beam from the chamber 11 is designated with 14. Below this last mentioned aperture 14 is arranged the material 15 to be treated in the space 2 in which, as already mentioned, prevails atmospheric pressure.

A plate 16 having an aperture 17 is arranged between the apertures 13 and 14. The arrangement is such that between the plate 16 and the adjacent walls of the chamber 11 which contain the apertures 13 and 14 there remains a very small air gap. This air gap is required so that the plate 16 may be moved laterally between the apertures 13 and 14. The plate 16 is mounted on ball bearings 18 and is reciprocated by means of a rotary disk 19 provided with an eccentric pin 20 which engages a cross slot in the plate 16. When the plate 16 is caused to reciprocate the communication between the apertures 13 and 14 is alternately opened and closed. At the instant the apertures 13 and 14 are in registration with the aperture 17 gas molecules or a pressure wave respectively, from the space 2 enters the interior of the aperture 17 and moves toward the space 1. According to the invention the time period during which the apertures 13 and 14 and 17 are in registration with each other is made so short that it is less than the time period which is required by the gas molecules entering the aperture 17 to pass through the same.

The longest time for passing through the aperture 17 is available for those molecules which at the start of the registration of the apertures 17 and 14 enter the aperture 17. Assuming that a small portion of these molecules pass in a straight line through the aperture 17 and are about to enter the aperture 13 at the end of the registration of the aperture 17 and 13 the strictest requirement for the speed of the plate 16 is the one which permits the establishment of a non-registration prior to the time such a molecule may pass through the opening 17. If one assumes that the molecular speed is 600 meters per second and that the length of the aperture 17 is 2 centimeters then the registration time between the apertures 13, 14 and 17 must not be longer than $.34 \times 10^{-4}$ seconds.

At the instant the apertures 13, 14 and 17 are in registration with each other, button 22 fixedly mounted on the plate 16 and consisting of ferro-magnetic material is positioned directly opposite the core of a coil 23. When this happens there is produced in the coil 23 a current impulse which is amplified by an amplifier 24 and is conducted by the line 25 to the Wehnelt cylinder 4 of the ray producing system. This current impulse causes the production of the electron beam 12 while on the other hand the electron beam remains shut off as long as no current impulse is received by the Wehnelt cylinder. This has the result that only in that instant in which the apertures 13, 14 and 17 are in registration with each other an electron beam 12 is produced and may reach the material 15 while during all other times in which no registration of the apertures 13, 14 and 17 takes place the electron beam 12 is shut off and therefore an undesirable heating of the parts in the path of this electron beam does not take place. During the time the apertures 13 and 14 are closed by a solid portion of the plate 16 the gas which has entered the aperture 17 is removed therefrom by the pump 26.

Figure 2 illustrates another embodiment of the invention in which in place of the reciprocating plate 16, as shown in Figure 1, there is employed a rotary disc 27. The high vacuum vessel 28 is in similar manner as shown in Figure 1, provided with a system for producing a corpuscular radiation which leaves the vessel 28 through an aperture 29. The high vacuum vessel 28 has attached thereto an intermediate pressure chamber 30 in which rotary disc 27 is mounted. This disc at its center is attached rigidly to a sleeve 31 which in turn forms a portion of a squirrel cage rotor 32. The rotor 32 and the stator 33 form together a synchronous motor which is mounted in the chamber 30. This chamber 30 is connected by means of a pipe 34 with a not illustrated vacuum pump and there is maintained in the chamber 30 a pressure of approximately $10^{-2}$ Torr. Below the chamber 30 there is arranged in similar manner, as shown in Figure 1, the chamber in which atmospheric pressure exists and in which the material to be treated is arranged. The intermediate pressure chamber 30 is in communication with the lower chamber by means of an aperture 35'. The rotary disc is provided along its circumference with a series of apertures 40 and the opposed rim faces of this disc 27 along the circumference are ground plane parallel. These ground faces rotate between the diaphragm bodies 35 and 37 in such a manner that between the diaphragm faces and the circumference of the disc there is produced a very narrow gap. The diaphragm bodies 35 and 37 are secured into walls of the intermediate pressure chamber 30 and the high vacuum vessel 28 respectively, by means of a thread so that it is possible to adjust the diaphragm bodies for changing the air gap between the diaphragm bodies and the circumferential portion 36 of the rotary disc 27. It is also possible to exchange the diaphragm bodies 35 and 37 by other ones having a different size aperture 32' and 29, respectively.

The sleeve 31 is mounted on an axle 38 by means of ball bearings and therefore is easily rotatable. The axle 38 is provided with an axial bore 39 closed at the lower end of the axle 38 and this axial bore is adapted to be used for the insertion of a cooling fluid for cooling the bearings. If one again assumes that the molecules have a speed of 600 meters per second while the length of the apertures 40 in the circumferential portion 36 of the disc 27 is 2 centimeters long while the diameters of the apertures 40 are 1 millimeter then it is necessary for fulfilling the above mentioned requirement that the disc 27 has the aperture 40 arranged on a circle having a diameter of 20 centimeters and that the disc 27 rotates with a speed of 6000 R. P. M. when from the beginning to the end of the registration of the apertures a path of 2 millimeters is assumed. The total time of registration will then be $.32 \times 10^{-4}$ seconds while a molecule for passing through the aperture 40 would require for a length of 2 centimeters a time period of $.34 \times 10^{-4}$ seconds.

In Figure 3 is disclosed still another embodiment of the invention in which the high vacuum vessel 28 has attached to its lower end an intermediate pressure chamber 41 which contains 2 rotary discs 27 and 42 rotating in opposite directions but in synchronism. The disc 27 is provided with an aperture rim 36 provided with the apertures 40 while the rotary disc 42 is provided with an aperture rim 43 provided with apertures 44. The rotary disc 27 is attached by means of a sleeve 31 fixedly with a squirrel cage rotor 32. The parts 32 and 33 constitute a synchronous motor arranged in the intermediate pressure chamber 41. The rotary disc 42 is connected by means of a sleeve 31' fixedly to a squirrel cage rotor 32'. The rotor forms with the stator 33' another synchronous motor. The two armatures rotate about the axles 38 and 38' of the two synchronous motors in such a manner that the two discs 27 and 42 rotate synchronously, but in opposite directions. In order to obtain in each position of the two discs 27 and 42 absolutely correct synchronous operation the disc 27 is provided with an exterior toothed rim 45 which engages another toothed rim 46 on the disc 42. In this case also the rays pass through diaphragm bodies 35 and 37 which by means of a thread are adjustably and exchangeably mounted in the walls of the intermediate pressure chamber 41 and the high vacuum vessel 28, respectively.

When employing two synchronous and oppositely rotating discs it is possible to employ a lower speed of revolutions of said discs, namely, a speed of 3000 R. P. M. assuming that the total length of the apertures 40 and 44 in the discs 27 and 42, respectively, does not exceed 2 centimeters. In place of decreasing the speed of the discs one may also decrease the total length of the apertures 40 and 44 from 2 centimeters to one centimeter.

In many cases it is necessary to cool the parts of the disc through which the apertures extend. For this purpose may be used for instance the device illustrated in Figure 10. It may be assumed that the diaphragm body 47 is provided with an aperture 48 through which a charge carrier beam passes. In order to prevent an undesirable heating of the diaphragm body 47 the aperture 48 is surrounded by a cooling system consisting of a pipe. The cooling medium is admitted at 49 and is discharged by 50.

The Figures 4 and 5 show still another embodiment of the present invention. Figure 5 illustrates a sectional view of Figure 4 substantially along the line 51—51'. The intermediate pressure chamber 52 is arranged below the high vacuum vessel 28' and below said intermediate pressure chamber 52 there is arranged a chamber under atmospheric pressure containing the material to be treated. A charge carrying beam is intended to leave the high vacuum vessel 28' through the aperture 53. A rotary drum 54 is arranged in the intermediate pressure chamber 52 and moves past two cylindrical ground faces 56 and 57 arranged on diametrically opposed zones of the intermediate pressure chamber 52. The arrangement is such that there remains a very small gap between the surfaces 56, 57 and the circumference of the drum 54. The apertures 53 and 55 are arranged opposed to each other in the upper and lower walls of the chamber 52. The drum 54 is provided with radial portions or apertures 58 which are adapted to come into registration alternately with the apertures 53 and 55, respectively. The axis of rotation of the drum 54 is arranged at a right angle to the direction of the charge carrying beam. The drum 54 is attached at one end of a tubular shaft 59 (Fig. 5) of a squirrel cage rotor 60 and is rotatably supported in roller bearing 61. The intermediate pressure chamber 52 increases in size rearwardly to accommodate the stator 62 of the synchronous motor. The chamber 52 is evacuated through an axial opening 63 so that the gas molecules entering the minute aperture 55 are removed from the chamber 52 before they have a chance to enter the aperture 53.

The modified arrangement of the invention as illustrated in the Figures 4 and 5 has over the modification illustrated in Figure 2 the advantage that the drum 54 has a substantially smaller diameter than the disc 27. The drum 54 has to rotate however with a very high speed. If, for instance the drum 54 has a diameter of 2 centimeters the circumferential speed of the drum will have to be approximately 30000 R. P. M. when the minute apertures have a diameter of 1 millimeter in order to fulfill the above mentioned requirement. It is, however, easily possible to rotate drums of such a small diameter with such a high speed by employing suitable materials. The synchronous motor consisting of the rotor 60 and the stator 62 may for instance be energized by an electric current having a frequency of 500 Hz.

In order to control the charge carrying beam in synchronism with the registration taking place between the apertures 53 and 55 one may employ for instance the photo electric device illustrated diagrammatically in Figure 4. For this purpose the intermediate pressure chamber 52 is provided with oppositely arranged windows 64 and 65 and a source of light 66 emits a light beam 67 which is directed into the window 64. This light beam 67 is deflected by the reflectors 68, 69 and 70, 71 and finally reaches a photo electric cell 72. It will be noted that the light beam during its passage through the chamber 52 passes through two apertures 58 and therefore when the drum 54 rotates the light beam will be intermittently interrupted. This has the result that the photo electric cell 72 generates an electrical signal through which in known manner the electron beam in the vessel 28' is controlled.

In place of the control device illustrated in Fig. 4 it is also possible to employ the magnetic control device illustrated in Fig. 1. Furthermore, it is also possible to employ for the control of the electron beam a capacitive control device.

In Figure 6 is illustrated still another arrangement of the invention, namely, a vacuum technical refinement of the arrangement illustrated in the Figs. 4 and 5. Above the upper wall of the casing 81 is arranged, as described already, the high vacuum vessel (not shown). In this upper wall is arranged an aperture 73 while the lower wall of the housing 81 contains an aperture 74 which is in communication with a housing arranged below the housing 81 and this lower housing is under atmospheric pressure. A rotary drum 75 is arranged in the same manner as the drum 54 in Fig. 4. However, in the interior of the drum 75 is arranged a stationary drum 76 provided with the diametrically opposed bores or passages 77 and 78. These last mentioned passages are arranged in alignment with the apertures 73 and 74. The drum 76 avoids that the gas molecules which are in the apertures 79 of the drum 75 enter the space 80 in the interior of the drum 76, and this has the result that the gas molecules for all practical purposes are prevented from entering the high vacuum vessel which is arranged above the casing 81.

Owing to the very high circumferential speed of the drum 75 it is not very well possible to employ in the arrangement of Fig. 6 any sealing devices which touch the drum 75. For this reason there is established between the stationary housing 81 and the drum 75 a narrow gap. The gas molecules entering the aperture 74 are pulled by the drum 75 when the latter rotates clockwise into the space 82 of the housing 81. This space 82 is separated by a partition 84 from the space 83 and it will be noted that there is also a very narrow gap between the drum 75 and the partition 84. The gas molecules entering the space 82 are substantially removed by a suction pump 85. This pump 85 produces at relatively high pressures a high suction and preferably is constructed as a rotary pump. The space 83 is connected with a diffusion pump 86 which at low pressures has a very high suction capacity. It is possible to maintain in the space 83 a higher vacuum than in the space 82. A similar separation by a partition 89 is established in the righthand portion of the housing 81 which is provided with the spaces 87 and 88 and which are connected with the pumps 90 and 91, respectively.

In order to reduce further the possibility of the entrance of gas into the aperture 74 the present invention contemplates the additional step of producing sound waves in said aperture 74, namely, sound waves of such a frequency that the same at the point 92 produce at that instant a low pressure when the apertures 74 and 79 are in registration. Such sound waves may be produced in a simple manner by tuning the air column in the aperture 74 to the opening frequency of the apertures 74 and 70. For this purpose there may be used for instance the arrangement illustrated in Fig. 7. The diaphragm body containing the aperture 74 is provided with a thread which engages a corresponding thread in a cylindrical body 93. By rotating the body 93 relative to the thread on the housing 81 an acoustic tuning of the air column in the aperture 74 is produced.

For the production of a sound wave in the aperture 74 may also be employed an arrangement as illustrated in Fig. 8. In this arrangement the aperture 74 is connected between its ends with a lateral passage 94 in which is arranged a diaphragm 95 of an electromagnetic system 96 which is adapted to produce sound waves.

Furthermore according to another feature of the present invention the pressure adjacent the aperture 74 may be reduced according to the principle of a jet pump. Such an arrangement is illustrated diagrammatically in Fig. 9. The wall 97 of the housing is provided with an aperture 96 which is in communication with the lateral passages 99 and 100. Through these lateral passages compressed air may be forced which will expel the gas molecules contained in the aperture 98 in a direction downwardly, namely, toward the space having a higher pressure. In this manner the pressure above the entrance point 101 is reduced.

In Figure 11 is illustrated a further modification of the arrangement illustrated in Fig. 1. Below the high vacuum vessel 1 is arranged a separation chamber 102 and below the latter there is arranged an additional separation chamber 103. Between the apertures 13 and 104 of the first intermediate pressure chamber 102 is arranged a plate 105 provided with an aperture 106. This plate 105 is reciprocated in the same manner as it is done with the plate 16 shown in Fig. 1, namely, by means of a rotary disc 107 provided with an eccentric pin 107' engaging a slot 105' in the plate 105. Between the apertures 104 and 108 is arranged an additional plate 109 which is provided with an aperture 110. This plate 109 in similar manner as shown in Fig. 1 is reciprocated by means of a rotary disc 111 carrying an eccentric pin 111' engaging a slot 109' in the plate 109. Both of the plates 107 and 111 are driven by synchronous motors and care is taken that these motors operate in synchronism. When the apertures 13, 106, 104 and 108 are in registration with each other the electron ray is caused to be produced and is able to pass from the vessel 1 into the space 2 arranged below the chamber 103. The space 2 is, as heretofore described, under atmospheric pressure and has arranged therein the material to be treated. For the control of the electron beam may be used an arrangement as shown in Fig. 1. When the apertures 13 and 108 are not in communication with each other because the plates 105 and 109 are moved to a position in which their apertures 106 and 110 are out of registration with said apertures then a rotary pump 112 removes any gas molecules from the intermediate pressure chamber 103 which have entered this chamber while the gas molecules having entered the intermediate pressure chamber 102 are removed by a rotary pump 113. It is in this manner possible to produce in the intermediate pressure chamber 102 substantially less pressure than is produced in the intermediate pressure chamber 103 so that for this reason the rotary pump 113 may be smaller in size than the rotary pump 112. It is furthermore advisable to make the plate 109 somewhat thinner than the plate 105 and the aperture 110 may be made smaller than the opening 106.

In Fig. 12 is illustrated still another modification of the invention in which between a high vacuum vessel 114 and a space 115 subjected to atmospheric pressure there is arranged an intermediate pressure chamber 116 in which a rotary device 123 is mounted. This rotary device 123 consists of four molded bodies 118 which are so shaped and so arranged that the same slide upon curved surfaces 121 and 122 arranged in the opposite walls of the intermediate pressure chamber 116. The curved surfaces 121 and 122 are intersected by the apertures 119 and 120, respectively. It will be noted that between the apertures 119 and 120 and the mentioned molded bodies 118 no air gap is provided. This means, of course, that the apertures 119 and 120 may be completely separated from each other or brought out of communication with each other by the rotary device, namely, then when the molded bodies 118 are in registration with said apertures 119 and 120, respectively. When, however, the two apertures 119 and 120 are in communication with each other, which takes place between each two molded bodies 118, then the electron beam may be passed through the space between said molded bodies 118 and the gas molecules which have entered the intermediate pressure chamber 116 during the time the aperture 120 is not covered is removed from said chamber through a pump 117.

In the foregoing it has been assumed when calculating the duration of the time period which is required by the gas molecules to pass through the apertures that the gas molecules pass in a straight line through said apertures, but this assumption very likely is not true in actual practice. It would be much more likely that the molecules do not travel in a straight path and if this is correct then the time periods required for the molecules to pass through the apertures would be greater. Accordingly, it would be possible to increase the duration during which the apertures may be left in registration with each other. Furthermore, the speeds of rotation of the rotary systems need not be as high as has been calculated in the foregoing.

It is also possible in a very simple manner to arrange in an arrangement, as shown in Fig. 2 which employs a rotary disc 27 and a single electron beam, a number of electron beams which pass through different apertures along the circumference of the disc 27 so that in this manner a number of high vacuum vessels may be employed with a single rotary disc 27, as shown in Fig. 2.

In the foregoing the present invention has been described in connection with various modifications illustrated in the Figs. 1-12, inclusive. It is, however, believed that the invention is not limited to these various embodiments but that the invention can be modified still more and be used in connection with other devices in which it is desired to transmit a high speed radiation between spaces of different pressures.

The described modifications may also be changed in various manners within the scope of the present invention and within the scope of the claims appended hereto.

What I claim is:

1. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, partitions in said intermediate subatmospheric pressure chamber dividing it into a plurality of sections, means for maintaining in each of said sections a different subatmospheric pressure, a movable member in each of said sections having an aperture adapted to move into registration with said apertures in said two walls, means adapted to produce a charge carrying beam in said high vacuum chamber and directing it through the apertures in said walls and in said movable members when all said apertures are in registration, means for each said movable members to cause their apertures to move out of and into registration with said alined apertures, control means for operating said charge carrying beam producing means when all said apertures are in registration and for rendering said charge carrying beam producing means inoperative when the apertures in said movable members are out of registration with said two alined apertures, and means for maintaining a high vacuum in said high vacuum chamber.

2. Arrangement for transmitting high-speed radiation, particularly corpuscular radiation, through spaces of different pressures, including means forming three chambers one next to the other, namely, a high vacuum chamber, an intermediate subatmospheric pressure chamber and an atmospheric pressure chamber, two walls separating said chambers from each other, an aperture in each of said walls, said apertures being arranged in alinement with one another, a movable member in said intermediate subatmospheric pressure chamber having an aperture adapted to be moved into registration with said apertures in said walls, means adapted to produce a charge carrying beam in said high vacuum chamber and directing it through said three apertures when the same are in registration, means for moving said movable member to cause its aperture to move out of and into registration with said two alined apertures at such a speed that the time during which said three apertures are in registration is shorter than the time the gas molecules entering the aperture in said movable plate from the chamber of higher pressure need for passing through said aperture, control means for operating said charge carrying beam producing means when said three apertures are in registration and for rendering said charge carrying beam producing means inoperative when the aperture in said movable member is out of registration with said other two apertures, means for continuously maintaining a high vacuum in said high vacuum chamber, and means for continuously maintaining a predetermined low pressure in said intermediate subatmospheric pressure chamber, said atmospheric pressure chamber being employed by receiving the material to be treated by said high-speed radiation.

3. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, a rotary disc in said intermediate subatmospheric pressure chamber being provided along its circumference with a series of apertures to be moved one after the other into registration with said apertures in said walls, means adapted to produce a charge carrying beam in said vacuum chamber and directing it through said two apertures when they are in registration with an aperture of said rotary disc, a synchronous motor for rotating the rotary disc to cause its apertures to move out of and into registration with said two alined apertures, control means for operating said charge carrying beam producing means when said apertures in the separating walls are connected by an aperture of said rotary disc and for rendering said charge carrying beam producing means inoperative when no aperture in said rotary disc is in registration with said other two apertures, means for continuously maintaining a high vacuum in said high vacuum chamber, and means for continuously maintaining a predetermined low pressure in said intermediate subatmospheric pressure chamber.

4. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, two rotary discs in said intermediate subatmospheric pressure chamber, each of said discs being provided along its circumference with a series of apertures to be moved between said two apertures, means adapted to produce a charge carrying beam in said vacuum chamber and directing it through said two apertures when these apertures are in registration with one aperture each of said rotary discs, two synchronous motors for rotating said two discs in opposite directions to cause their apertures to move out of and into registration with said two alined apertures, each of said rotary disc being provided with a toothed rim, said rims engaging another in order to obtain absolutely correct synchronous operation of the discs, control means for operating said charge carrying beam producing means when said apertures in the separating walls are connected by one aperture each of said rotary discs and for rendering said charge carrying beam producing means inoperative when no aperture in said rotary discs is in registration with said other two apertures, means for continuously maintaining a high vacuum in said high vacuum chamber, and means for continuously maintaining a predetermined low pressure in said intermediate subatmospheric pressure chamber.

5. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, a rotary drum in said intermediate subatmospheric pressure chamber being provided with radial apertures opposed diametrically to be moved alternately into registration with said two apertures, means adapted to produce a charge carrying beam in said vacuum chamber and directing it through said two apertures when they are in registration with diametrically opposed apertures of said rotary drum, a synchronous motor for rotating the rotary drum to cause its apertures to move out of and into registration with said two alined apertures, control means for operating said charge carrying beam producing means when said two apertures in the separating walls are connected by two diametrically opposed apertures of said rotary drum and for rendering said charge carrying beam producing means inoperative when no aperture in said rotary drum is in registration with said other two apertures, means for continuously maintaining a high vacuum in said high vacuum chamber, and means for continuously maintaining a predetermined low pressure in said intermediate subatmospheric pressure chamber.

6. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, a movable member in said intermediate subatmospheric pressure chamber having an aperture adapted to be moved into registration with said apertures in said walls, means adapted to produce a charge carrying beam in said high vacuum chamber and directing it through said three apertures when the same are in registration, means for moving said movable member to cause its aperture to move out of and into registration with said two alined apertures, photoelectric control means for operating said charge carrying beam producing means when said three apertures are in registration and for rendering said charge carrying beam producing means inoperative when the aperture in said movable member is out of registration with said other two apertures, means for continuously maintaining a high vacuum in said high vacuum chamber, and means for continuously maintaining a predetermined low pressure in said intermediate subatmospheric pressure chamber.

7. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, a movable member in said intermediate subatmospheric pressure chamber having an aperture adapted to be moved into registration with said apertures in said walls, means adapted to produce a charge carrying beam in said high vacuum chamber and directing it through said three apertures when the same are in registration, means for moving said movable member to cause its aperture to move out of and into registration with said two alined apertures, control means for operating said charge carrying beam producing means when said three apertures are in registration and for rendering said charge carrying beam producing means inoperative when the aperture in said movable member is out of registration with said other two apertures, the aperture in the wall separating the atmospheric pressure chamber from the intermediate subatmospheric pressure chamber being constructed in such a manner and the air column in aperture tuned to the aperture frequency so that when this aperture comes into communication with the aperture in said movable member a low pressure is produced at the edge of the intermediate subatmospheric pressure chamber where the aperture connects with said last mentioned chamber, means for continuously maintaining a high vacuum in said high vacuum chamber, and means for continuously maintaining a predetermined low pressure in said intermediate subatmospheric pressure chamber.

8. Arrangement for transmitting high-speed radiation, particularly corpuscular radiation, through spaces of different pressures, including means forming three chambers one next to the other, namely a high vacuum chamber, an intermediate subatmospheric pressure chamber and an atmospheric pressure chamber, two walls separating said chambers from each other, an aperture in each of said walls, said apertures being arranged in alinement with one another, a movable member in said intermediate subatmospheric pressure chamber having an aperture adapted to be moved into registration with said apertures in said walls, means adapted to produce a charge carrying beam in said high vacuum chamber and directing it through said three apertures when the same are in registration, means for moving said movable member to cause its aperture to move out of and into registration with said two alined apertures, control means for operating said charge carrying means when said three apertures are in registration and for rendering said charge carrying beam producing means inoperative when the aperture in said movable member is out of registration with said other two apertures, the aperture in the wall separating the atmospheric pressure chamber from the intermediate subatmospheric chamber being in communication with lateral passages through which compressed air is forced in a direction toward the atmospheric pressure chamber so that the pressure at the edge of the intermediate subatmospheric pressure chamber is reduced, means for continuously maintaining a high vacuum in said high vacuum chamber, and means for continuously maintaining a predetermined low pressure in said intermediate subatmospheric pressure chamber.

References Cited in the file of this patent

UNITED STATES PATENTS

| 2,292,087 | Ramo | Aug. 4, 1942 |
| 2,640,948 | Burrill | June 2, 1953 |